(12) United States Patent
Cox et al.

(10) Patent No.: US 8,073,977 B2
(45) Date of Patent: Dec. 6, 2011

(54) INTERNET TELEPHONY THROUGH HOSTS

(75) Inventors: Jonathan Cox, La Mesa, CA (US);
Andrew B. Kahng, Del Mar, CA (US);
Puneet Sharma, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 779 days.

(21) Appl. No.: 10/569,569

(22) PCT Filed: Sep. 3, 2004

(86) PCT No.: PCT/US2004/028664
§ 371 (c)(1),
(2), (4) Date: Feb. 27, 2006

(87) PCT Pub. No.: WO2005/026892
PCT Pub. Date: Mar. 24, 2005

(65) Prior Publication Data
US 2007/0005729 A1    Jan. 4, 2007

Related U.S. Application Data

(60) Provisional application No. 60/500,867, filed on Sep. 5, 2003.

(51) Int. Cl.
*G06F 15/16* (2006.01)
(52) U.S. Cl. ........................................ 709/249; 709/238
(58) Field of Classification Search .................. 709/200, 709/238, 249
See application file for complete search history.

(56) References Cited

U.S. PATENT DOCUMENTS

| 5,764,639 A | 6/1998 | Staples et al. |
| 5,870,465 A | 2/1999 | Hosbach et al. |
| 5,889,845 A | 3/1999 | Staples et al. |

(Continued)

FOREIGN PATENT DOCUMENTS

CA    2205731    11/1998

(Continued)

OTHER PUBLICATIONS

K. Uchiyama, H. Ignacio, "Internet-to-POTS Telephony Gateway", http://www.cs.columbia/edu/~hgs/teaching/ais/1998/projects/itg_sip/report.html.

(Continued)

*Primary Examiner* — Douglas Blair
(74) *Attorney, Agent, or Firm* — Greer, Burns & Crain Ltd.

(57) ABSTRACT

Systems of the invention employ peer-to-peer and centralized server networking to enable POTS/PSTN/PBX phone lines to be shared with other users of the system over the Internet. An example application of the invention is to allow a person, having access to an Internet connection, to receive calls and make calls using his/her home or office telephone, or using the phones of other parties that he/she is authorized to access. In preferred embodiments, the invention can exploit availability of an existing voice modem port on the user's home or office computer, and can require only the installation of software on the home or office computer, and on whatever device (laptop, PDA, computer, mobile phones, etc.) is employed by the user in the remote location. Variant realizations of the invention may also provide any combination of features typically available to phone users, including, for example, the following features: authentication, verification, directory services, directory search, access rights, call forwarding, call answering, voice, mail, missed-call information, call screening, and caller identification.

19 Claims, 4 Drawing Sheets

U.S. PATENT DOCUMENTS

| | | | |
|---|---|---|---|
| 5,940,598 A | | 8/1999 | Strauss et al. |
| 6,028,917 A | | 2/2000 | Creamer et al. |
| 6,069,890 A | | 5/2000 | White et al. |
| 6,075,783 A | * | 6/2000 | Voit .................... 370/352 |
| 6,144,667 A | * | 11/2000 | Doshi et al. ............. 370/401 |
| 6,161,008 A | | 12/2000 | Lee et al. |
| 6,169,795 B1 | | 1/2001 | Stern et al. |
| 6,188,762 B1 | | 2/2001 | Shooster |
| 6,215,790 B1 | | 4/2001 | Voit et al. |
| 6,252,952 B1 | | 6/2001 | Kung et al. |
| 6,301,339 B1 | | 10/2001 | Staples et al. |
| 6,373,817 B1 | | 4/2002 | Kung et al. |
| 6,373,836 B1 | | 4/2002 | Deryugin et al. |
| 6,381,320 B1 | | 4/2002 | Creamer et al. |
| 6,411,704 B1 | | 6/2002 | Pelletier et al. |
| 6,425,000 B1 | | 7/2002 | Carmello et al. |
| 6,446,127 B1 | * | 9/2002 | Schuster et al. ............. 709/227 |
| 6,477,246 B1 | | 11/2002 | Dolan et al. |
| 6,493,427 B1 | | 12/2002 | Kobylevsky et al. |
| 6,542,500 B1 | | 4/2003 | Gerszberg et al. |
| 6,546,016 B1 | * | 4/2003 | Gerszberg et al. ............. 370/401 |
| 6,587,557 B1 | | 7/2003 | Smith |
| 6,738,382 B1 | | 5/2004 | West et al. |
| 6,876,632 B1 | | 4/2005 | Takeda |
| 6,909,778 B2 | * | 6/2005 | Wengrovitz ............. 379/201.01 |
| 7,123,608 B1 | * | 10/2006 | Scott et al. .................... 370/353 |
| 7,394,803 B1 | * | 7/2008 | Petit-Huguenin et al. .... 370/352 |
| 7,406,306 B2 | * | 7/2008 | Gallant et al. ................. 455/406 |
| 7,457,279 B1 | * | 11/2008 | Scott et al. .................... 370/352 |
| 7,783,013 B2 | * | 8/2010 | Laliberte ........................ 379/37 |
| 2001/0001610 A1 | | 5/2001 | McElvaney |
| 2002/0033416 A1 | * | 3/2002 | Gerszberg et al. ............. 235/380 |
| 2002/0118671 A1 | * | 8/2002 | Staples et al. ................ 370/352 |
| 2003/0043787 A1 | | 3/2003 | Emerson, III |
| 2003/0053446 A1 | | 3/2003 | Kwon |
| 2003/0118004 A1 | * | 6/2003 | Pan ............................... 370/352 |
| 2004/0032863 A1 | | 2/2004 | Schoeneberger |
| 2009/0010409 A1 | * | 1/2009 | Gallant et al. ........... 379/114.14 |

FOREIGN PATENT DOCUMENTS

| | | |
|---|---|---|
| CN | 1384641 | 12/2002 |
| EP | 1017 208 | 7/2000 |
| EP | 1035719 | 9/2000 |
| EP | 1104157 | 5/2001 |
| EP | 1 241 852 | 9/2002 |
| EP | 1313300 | 5/2003 |
| GB | 2357657 | 6/2001 |
| GB | 2383715 | 7/2003 |
| JP | 2002-335328 | 11/2002 |
| JP | 2003-169134 | 6/2003 |
| WO | WO/2003/071752 | 8/2003 |
| WO | WO2004017543 | 2/2004 |

OTHER PUBLICATIONS

K. Sullivan, "Videoconferencing Arrives on the Internet," PC Week, Aug. 19, 1996.

P. Korzeniowski, "Novell's Telephony Plan at Sink-or-Swim Juncture," PC Week, Mar. 25, 1996.

M. Mills, "Phone Service Via the Internet May Slash Rates," The Washington Post, Aug. 11, 1996, p. A4.

D. Hughes, "WebPhone Heading for Serious Telephony," The Fairfax Journal, May 28, 1996, p. A8.

G. Venditto, "Internet Phones, The Future is Calling," Internet World, Jun. 1996, pp. 40-52.

ftp://ftp.isi.edu/internet-drafts/draft-ford-natp2p-00.txt "Internet Draft—Network Address Translation and Peer-to-Peer Applications (NATP2P)".

http://www.alumni.caltech.edu/~dank/peer-nat.html "NAT and Peer-to-Peer Networking."

J. Hill et al., "Real-Time Communication," PC Magazine, Oct. 8, 1996.

De Serres, Yves et. al., "Value Added Services in the Converged Network", IEEE Communications Magazine, IEEE Service Center, Piscataway, US, vol. 39, No. 9, pp. 146-154, Sep. 1, 2001.

* cited by examiner

INTERNET TELEPHONY THROUGH HOSTS

PRIORITY CLAIM

Applicants claim priority benefits under 35 U.S.C. §119 on the basis of Patent Application No. 60/500,867, filed Sep. 5, 2003.

TECHNICAL FIELD

The field of the invention is telephony.

DISCLOSURE OF INVENTION

Systems of the invention employ peer-to-peer and centralized server networking to enable POTS/PSTN/PBX phone lines to be shared with other users of the system over the Internet. An example application of the invention is to allow a person, having access to an Internet connection, to receive calls and make calls using his/her home or office telephone, or using the phones of other parties that he/she is authorized to access. In preferred embodiments, the invention can exploit availability of an existing voice modem port on the user's home or office computer, and can require only the installation of software on the home or office computer, and on whatever device (laptop, PDA, computer, mobile phones, etc.) is employed by the user in the remote location. Variant realizations of the invention may also provide any combination of features typically available to phone users, including, for example, the following features: authentication, verification, directory services, directory search, access rights, call forwarding, call answering, voice mail, missed-call information, call screening, and caller identification.

DESCRIPTION OF THE EXEMPLARY EMBODIMENTS

Figure 1:
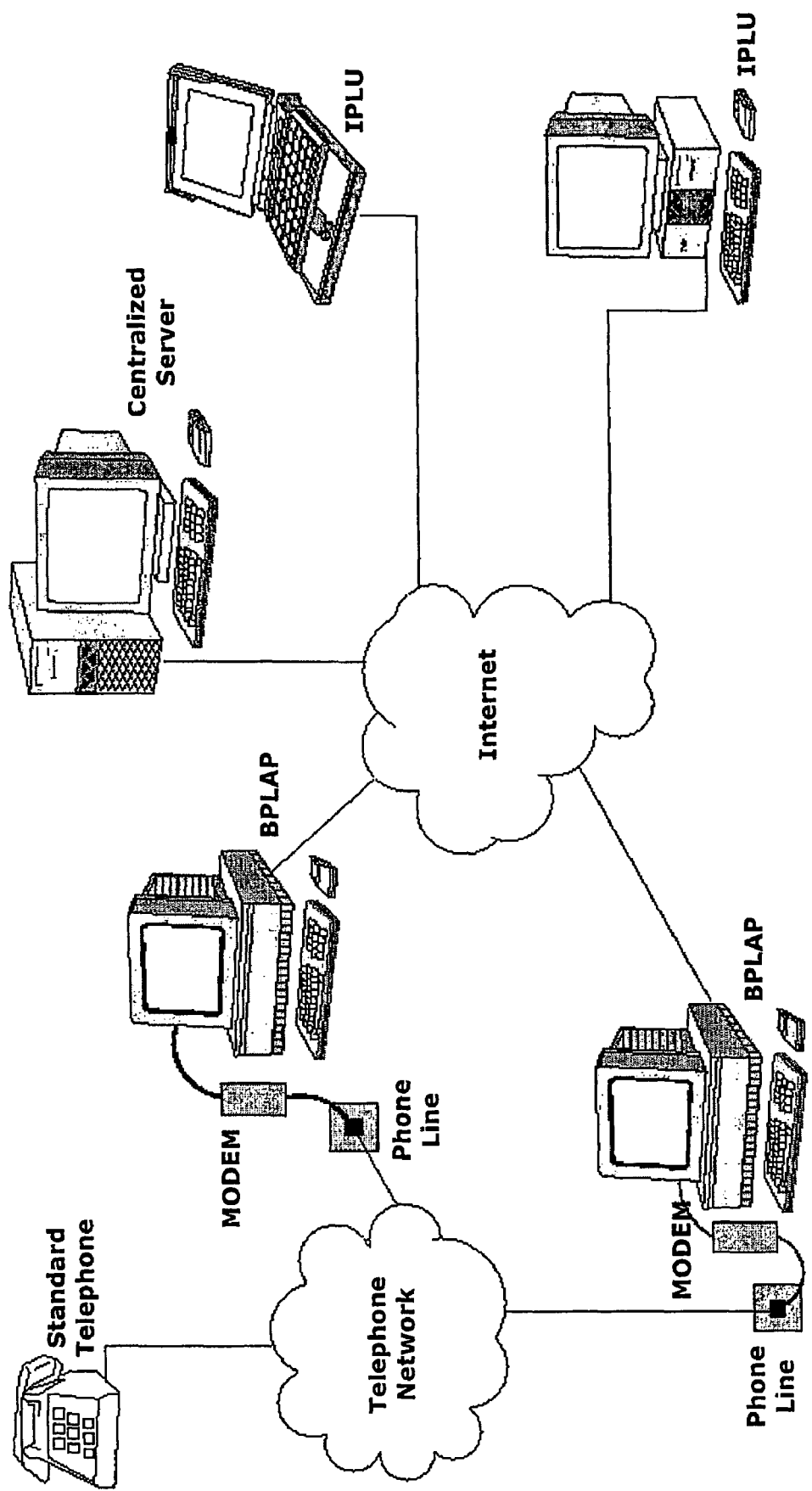
FIG. 1 shows a general framework for implementation of methods of the invention and represents a preferred system of the invention.

The invention is directed to methods and systems for providing the internet use of a phone line connected to a host computer that is connected to a telephone system. Preferred embodiments of the invention are implemented in software. A server accessible through the internet provides access control to a remote client that accesses phone services through the host computer. The invention includes software for hosts and hosts enabled to perform such methods, software for servers and servers enabled to perform such methods, and software for clients and clients enabled to perform such methods. In preferred embodiments, a full range of standard phone services is provided to a client through a host machine via the internet. The method also includes new business models for phone usage, such as a subscription internet phone usage service. In an example, the service provides local call service to geographic areas from outside the areas. A full range of communications may be provided, including, for example standard voice communication, fax communications, high-quality GSM-compressed voice, etc. A host machine or banks of host machines are connected to telephone systems in the local geographic area. For all intents and purposes, a client makes use of phone services from anywhere with an internet connection as if the client was using a phone connection in the local geographic area. This powerful tool has many business applications.

A preferred system of the invention enables people to use their PCP (POTS, cell, PBX) phone connection(s) from anywhere that an Internet connection is available. The system provides the functionality of a cellular phone to people connecting to the internet through wireless device(s). Selective routing of calls allows a phone connection to be conveniently shared by multiple internet users. The system is capable of minimizing long-distance or toll charges by locating and using the BPLAP which may contact the destination PCP phone with the lowest charge or toll. Conversely, a PCP phone may call the BPLAP which will incur the lowest toll or long-distance charge. Voicemail, conferencing, forwarding, and other telephony services will require minimal effort to incorporate and can be provided for little or no additional expense. Both individual and enterprise customers will be attracted by the convenience of "anytime, anywhere" access to their home and/or office telephone connections, and will be willing to pay a fee for access to this system.

A preferred embodiment is a system of hosts, particularly bi-directional phone line access points (BPLAPs), a centralized server, and clients, particularly Internet phone line users (IPLUs). The system seamlessly integrates the plain old telephone system (POTS), cellular phone network or PBX network (collectively referred to as PCP) to the Internet, such that Internet users may share BPLAPs for the purposes of placing calls into, and receiving calls from, the PCP networks. In addition, conventional PCP callers may call specific BPLAPs so that they may seamlessly contact specific IPLUs. No additional hardware, besides a personal computer with a voice modem, is required for a BPLAP. The system provides a number of features and operations.

The centrally coordinated, bi-directional sharing of phone lines over the Internet allows IPLUs to safely and securely place calls over the Internet to traditional PCP phones via a BPLAP. This process is coordinated by a centralized server.

The centralized, bi-directional sharing of phone lines over the Internet allows standard PCP callers to safely and securely place calls from the PCP networks, to a BPLAP and thence to IPLUs on the Internet. This process is coordinated by a centralized server.

The central server and BPLAPs can control access to BPLAPs for the purpose of preventing unauthorized use of a BPLAP. No hardware, beyond a personal computer with a voice modem, is required for an individual to set up a BPLAP. Only an available phone line and a software download are necessary to become part of, and start using, the system.

An IPLU can contact the central server so that it will search its directory of BPLAPs for an available BPLAP which the IPLU has sufficient access rights to use. An IPLU can establish a communications channel with a BPLAP directly, with the assistance of a central server, such that data may be exchanged without sending data through a central server, even if the IPLU and BPLAP are both behind firewalls. In other words, a "peer-to-peer" functionality is possible.

The centralized server maintains a directory of information regarding the IPLUs and BPLAPs which are registered to use the system. As a result, IPLUs may search for specific BPLAPs, while BPLAPs may contact specific IPLUs—as the result of an automated process (such as voicemail notification), or a manual search.

Any existing voicemail, PBX or answering machine functionality may be realized by the system, as well as novel functionalities. For example, BPLAPs can serve multiple IPLUs by asking the incoming PCP caller which IPLU(s) he wishes to contact. The PCP caller may answer verbally or by transmitting a standard DTMF touch-tone. Subsequently, the BPLAPs will register the communication request with the centralized server. If the IPLU is not available, a voice mail system will be activated, such that the recorded message may be stored on the central server for later retrieval by an IPLU.

In the system of the invention, the centralized server communicates with BPLAPs and IPLUs to provide remote telecommunication services. Aspects of these services provided by the centralized server may include, but are not limited to, the following. (1) Authentication. This prevents unauthorized IPLUs from remotely accessing phone lines which they are not permitted to access. (2) Tunneling. This facilitates data exchange between IPLUs and BPLAPs, e.g., when one or more users' local networks exist "behind" a firewall, proxy, or NAT device, by transferring data through the centralized server. (3) Initiation of peer-to-peer communication. IPLUs behind a firewall/proxy/NAT are afforded direct access to BPLAPs, which may also be behind a firewall/proxy/NAT, through initiation of a communications channel without transmitting data through the centralized server. (4) Routing. The server can fulfill connection requests by BPLAPs and IPLUs, by routing such requests to appropriate remote systems. (5) Directory. The server maintains a directory of information pertaining to each BPLAP or IPLU which has used, or attempted to use, the telecommunications network. IPLUs may request access to remote phone lines based upon the availability of BPLAPs, as specified by the directory. In addition, BPLAPs that receive incoming calls may contact the centralized server, which in turn notifies the appropriate IPLU(s) of an incoming call, as specified in the directory. If the appropriate IPLU(s) is (are) not available, the server stores information regarding the missed call. (6) Directory search. IPLUs may search the directory to find available shared phone lines (to which they have access rights), and/or BPLAPs may find specific IPLUs to which they forward a call, initiate a call, or broadcast a message. (7) Access rights. The directory stores information regarding access rights of each IPLU to each BPLAP. These rights may include call length, calling area, total charges incurred (either as a running balance or credit), unauthorized phone numbers, and other restrictions pertinent to the use of a phone line.

The BPLAP enables bidirectional sharing of a phone line over a network and communicates with a centralized server. In practice, the BPLAP may seek to automatically establish and maintain, whenever possible, a connection to the centralized server. In preferred embodiments the BPLAP may provide the following functions. (1) Phone line interface. The BPLAP uses software to allow a standard voice modem (alternatively, sound card with external adapter) to function as an interface between the phone line and the network communications channel. (2) Authentication and verification. The BPLAP may verify the authenticity of the centralized server. In addition, it may individually verify the authenticity and access rights of IPLUs that wish to remotely access the shared phone line, as specified by the administrator of the BPLAP or a trusted centralized server. (3) Call forwarding. When the BPLAP detects an incoming call, it may contact the centralized server and ask the server to determine the availability of specific IPLU(s) which have sufficient access rights to answer the call, or it may ask the server to specify which IPLU(s) should be capable of answering the call. (4) Call answering. If the server notifies the BPLAP that IPLU(s) have answered the call, the BPLAP will answer the phone line call and forward all audio to the IPLU(s) who have answered. In addition, the BPLAP will receive all audio which is transmitted from IPLU(s) who have answered, and transmit it over the phone line. (5) Voice mail and missed calls. If no IPLUs are available to answer an incoming call from a BPLAP, the BPLAP registers the details of the missed call with the centralized server. In addition, the BPLAP may answer the call, if directed by its administrator either locally or via the centralized server, and play a prerecorded greeting. Subsequently, the calling party may record a message which may be uploaded to the centralized server and retrieved by the appropriate IPLUs at a later time. Virtually all voicemail and answering machine functions may be implemented within this framework, e.g., private voicemail boxes, changing the prerecorded greeting, etc. (6) Local-call routing. If an incoming call is received, the BPLAP may answer the call and ask the calling party which person, from a limited list, they wish to contact. The calling party may answer this question using their voice, or by transmitting a DTMF tone. Depending on the calling party's answer, the BPLAP will contact the centralized server with a request that the IPLU(s) that are owned by the specified user(s) answer the call. Additional call routing functionality can be afforded by the BPLAP.

The IPLU initiates and/or receives remote calls over a network and communicates with a centralized server. Preferred functionality implemented by the IPLU includes, but is not limited to, the following. (1) Directory search. The IPLU may contact the centralized server with a request to find BPLAPs which the user may remotely access. The search may be performed by geographic area, cost, or other criteria. (2) Voicemail and missed calls. The IPLU may contact the centralized server with a request to receive information regarding missed phone calls (as specified by associated BPLAPs) and voicemail messages. (3) Call answering. The IPLU receives notification from BPLAPs of incoming phone calls which may be answered by the IPLU. If teleconferencing is enabled, the IPLU may answer any calls, even if they have already been answered by other IPLUs. (4) Call initiation. The IPLU may place a call to a PCP phone line via a BPLAP on the telecommunications network. The BPLAP which provides the PCP link may be specifically chosen by the IPLU, selected according to geographical location or other criteria, and/or found by other means from the centralized directory.

Figure 2:
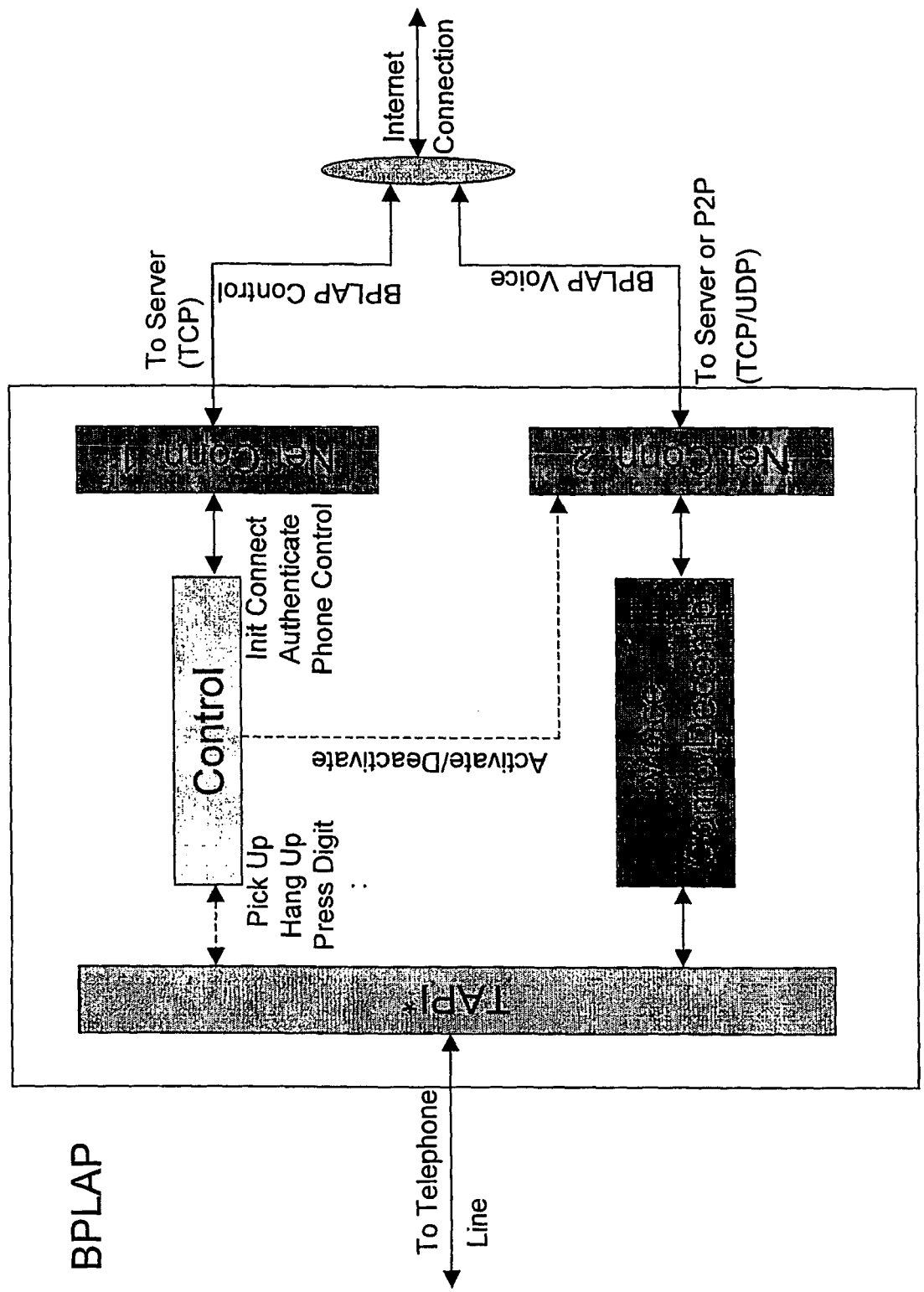
FIGS. 2-4 show preferred embodiment architectures, respectively, for an BPLAP, or host, an IPLU, or client, and a centralized server.
Figure 3:
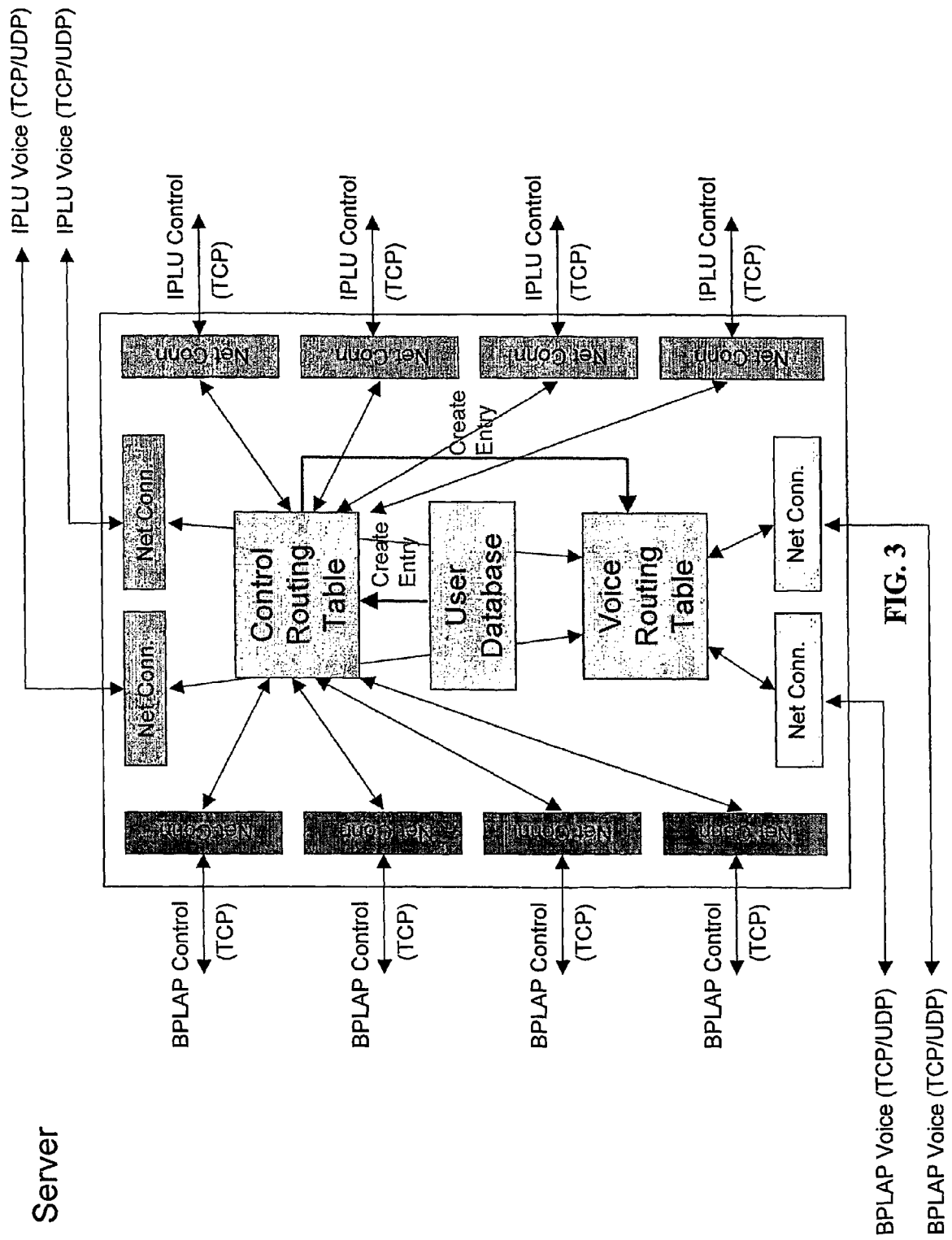
Figure 4:
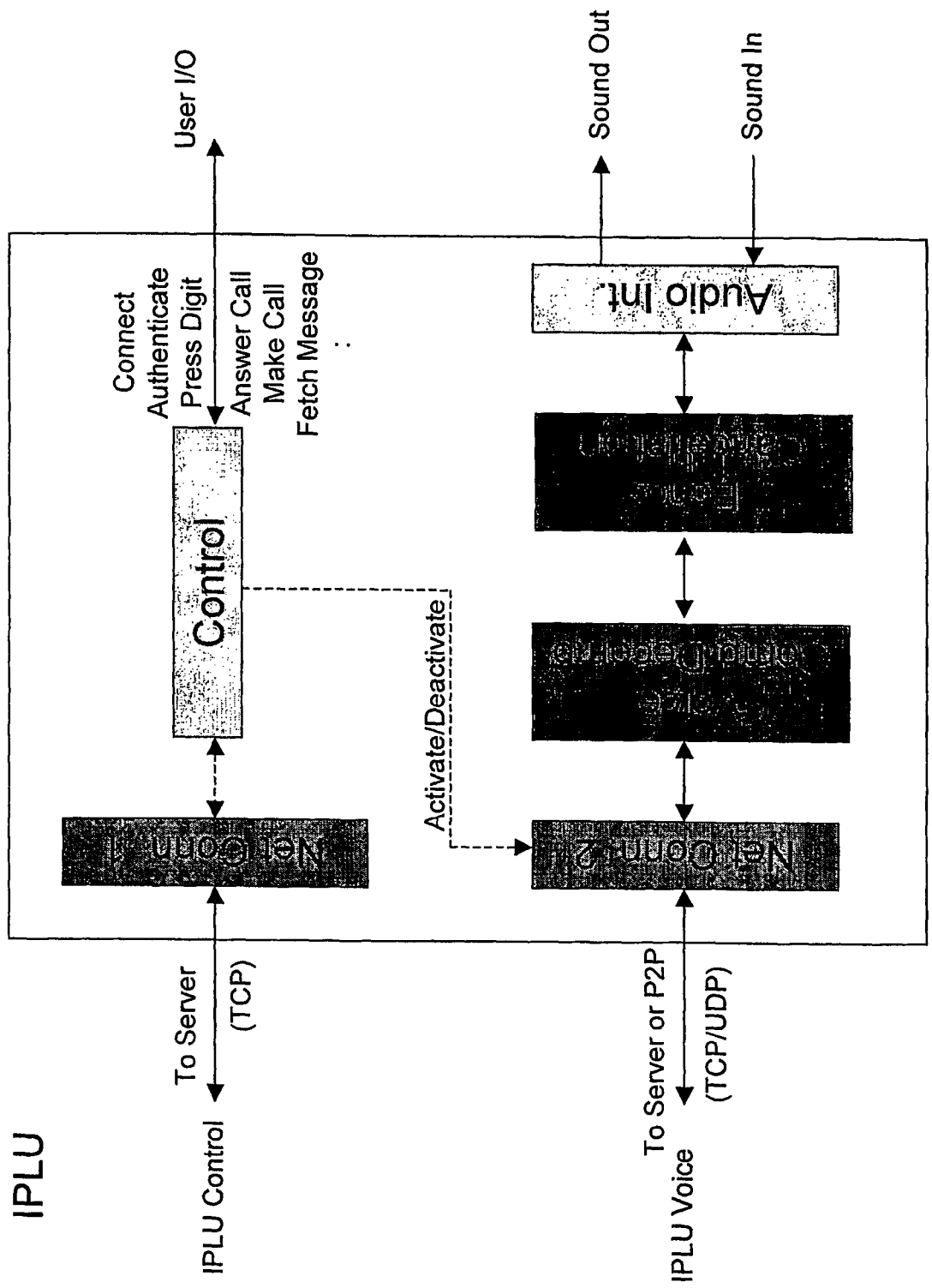

FIG. 1 shows a general framework for implementation of embodiments of invention such as those described above. FIGS. 2-4 show preferred embodiment architectures, respectively, for an BPLAP, an IPLU and a centralized server.

BPLAP

Control

The control box requests a control connection to the server and sends the username and password for authentication. Once authenticated by the server, the control module waits for commands from the server or incoming calls on the phone line.

If the BPLAP receives an incoming call, the control module notifies the server. The server determines which IPLUs are subscribed to receive calls from this BPLAP, have the proper permissions to do so, and are currently connected. If one or more IPLUs are available, they may answer the call so as to communicate with the calling party. After the IPLU user decides to answer the call, the request is relayed to the BPLAP, where the PCP phone call is taken off-hook by the TAPI module.

After the BPLAP answers the call (i.e., has taken the phone line "off-hook"), the control module communicates with the server to establish a voice stream (denoted by the Comp/Decomp module) either with the central server or directly with the IPLU(s) which have answered the call. If the BPLAP is configured to send the voice stream through the central server, the central server communicates with the IPLU's control module to initiate a voice stream from the IPLU(s) to the BPLAP.

In addition, the control honors commands to dial a digit, hang up, pick up handset, etc. from the server. It uses the TAPI module to communicate with the phone line.

TAPI

This module provides an interface to access the phone line. The module is capable of sending/receiving voice to/from the phone and is capable of controlling the phone by picking up the receiver, hanging up or dialing the digits.

Voice Comp/Decomp

This module provides voice compression and decompression. Voice is compressed before sending over IP and compressed voice received over IP is decompressed before playing by this module. One of several available compression schemes (e.g., GSM, CCITT G.721/G.723) may be used depending on the allocated CPU utilization and quality desired.

Server

User Database

The user database contains the authentication information for each IPLU and BPLAP, the subscription information which describes which IPLUs wish to receive calls from certain BPLAPs, and the permissions information which describes which IPLUs may send and/or receive calls from certain BPLAPs. Connection requests from the BPLAPs and IPLUs are entertained by the user database module and authentication is done. Once a BPLAP or IPLU is authenticated the connection handle is transferred to the control routing table module.

Control Routing Table

This module maintains sets of BPLAPs and IPLUs that are permitted to access each other. For each set, this module listens to BPLAP and IPLU connections and transmits commands to the other side. If no IPLU users are available to answer an incoming call, this module stores the message from the caller. A "message waiting" command is sent to the IPLUs and the message can be fetched by the IPLUs. If a voice channel is requested by the IPLU and the BPLAP communicating with it, this module opens a voice channel and makes entries to the voice routing table.

The BPLAP and IPLU attempt to maintain a control connection with the server as much as possible (for example, for an IPLU to be notified of incoming calls or to make outgoing calls).

Voice Routing Table

This module creates pipes to transfer data coming on one interface to another as directed by the user database module.

Entries are added to the control routing table when an IPLU or BPLAP connects to the server. The entry is preserved till the IPLU/BPLAP to which the entry corresponds to, is disconnected. Entries in the voice routing table are created only when the BPLAP and IPLU wish to open a voice channel through the server. In the case where the BPLAP and the IPLU use P2P for voice, no entry is made in the voice routing table. The control routing table may do some command translation.

IPLU

Control

The control module begins by connecting with the server and sending the username and password. Once authenticated, a control connection is established with the server. The control module listens to user inputs such as handset picked up, digit pressed, call hang up etc., and sends appropriate commands to the server which transmits them to the BPLAP.

If the server indicates an incoming call, the control module notifies the user about it. If the user decides to take the call, the server is requested to open a voice connection.

Voice Comp/Decomp

This module compresses voice before sending it out through a network interface and decompresses compressed voice coming from the network interface before playing it for the user of the IPLU.

Echo Cancellation

If the audio at the IPLU is loud, the caller speaking with him will hear an irritating echo when he speaks. This module filters out the sound played by the speaker from the sounds picked by the microphone.

Audio Interface

The interface provides audio input and output functions, e.g., speaker and microphone functions and analog to digital conversion of audio as well as digital to analog conversion of audio data.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for providing telephony services through the Internet, the method comprising:

by a server available through the Internet, communicating with a plurality of hosts, said plurality of hosts comprising personal computers, each host being connected to a local phone service via a local phone line and to the server via the Internet, the server communicating with clients through the Internet to provide clients access to local phone services and communications through the local phone lines of the plurality of hosts, wherein the server routes a phone call from a client through the Internet to an available host that is in the local area of the destination of the phone call by searching a directory of available hosts and providing a client an available host for the phone call so that the client and available host can communicate directly without sending data through the server, and the phone call proceeds through the local phone service of the available host that is in the local area via the local phone line of the available host that is in the local area via data exchange between the available host and the client without sending data through the server.

2. The method of claim 1, wherein said local phone lines of said plurality of hosts comprises home and/or office telephone connections.

3. The method of claim 2, wherein said home and/or office telephone connections comprise telephone company customer connections.

4. A server computer accessible through the Internet, the server computer being configured to provide access control to a remote client that accesses phone services and a plurality of phone lines through a plurality of host computers to provide the remote client via the Internet with local phone services and communications through the plurality of phone lines available through the plurality of host computers, said plurality of host computers comprising personal computers, wherein the server computer routes a phone call from the remote client through the Internet to an available host that is in the local area of the destination of the phone call by searching a directory of available host computers and providing the remote client an available host computer for the phone call so that the remote client and available host computer can communicate directly without sending data through the server, and the phone call proceeds through the local phone service of the available host computer that is in the local area via the local phone line of the available host computer that is in the local area via data exchange between the available host computer and the remote client without sending data through the server.

5. The server of claim 4, wherein the server computer is configured to provide one or more of the following services: authentication, tunneling, initiation of peer-to-peer communication, routing, directory, directory search, and access rights.

6. The server of claim 4, wherein said plurality of local phone lines comprise home and/or office telephone connections.

7. A host computer having access to a local phone line that connects to a local phone service and an Internet connection, the host computer comprising a personal computer being configured to provide Internet server-enabled access to the local phone line and service via a server that controls access to the host computer and to a plurality of other hosts computers by identifying available local host computers in response to client requests for communication through the local phone line via an internet connection and by permitting a client to exchange data with the host computer without sending data through the server to utilize the local phone service through the local phone line, wherein the host computer exchanges data with the client without sending data through the server to route a server-enabled client phone call having a destination in the host's local phone service from the Internet through the local phone service of the host computer via the local phone line.

8. The host of claim 7, wherein a server controls client access to the host.

9. The host of claim 8, wherein the server is configured to provide one or more of the following services: directory search, voicemail and missed calls, call answering, and call initiation.

10. The host computer of claim 7, wherein said local phone line comprises a home or office telephone connection.

11. A client device enabled to access a plurality of local phone services of a plurality of host computers, said plurality of host computers comprising personal computers connected to the plurality of local phone services via a plurality of local phone lines, the client accessing the plurality of local phone services and phone lines of the plurality of host computers through an Internet connection controlled by a server computer, the client device having functions for requesting access to the local phone service, and for performing communications through an established connection with the local phone services via the local phone lines, wherein the client device requests Internet access from the service to an available host computer that is in the local service of the destination of a phone call and, when the server grants access by identifying an available host computer to the client, and the client exchanges data with the available host computer without sending data through the server to direct the phone call through the Internet to the available host computer that is in the local service so that the call proceeds through the local phone service of the available host computer that is in the local area via the local phone line of the available host computer that is in the local area.

12. The client of claim 11, wherein the client device is configured to provide one or more of the following services: phone line interface, authentication, verification, call forwarding, call answering, voice mail and missed calls, and local-call routing.

13. The client device of claim 11, wherein said plurality of local phone lines comprise home and/or office telephone connections.

14. A system for providing phone services to Internet users through the Internet, the system comprising:
a plurality of host computers, said plurality of host computers comprising personal computers, each host computer having access to a local phone service through a local phone line; and
at least one server that controls access between said plurality of host computers and phone service clients seeking to access local phone services through the local phone lines of the plurality of host computers through the Internet, wherein the server routes an Internet user phone call through the Internet to a host computer that is in the local area of the destination of the phone call by searching a directory of available host computers and providing the remote client an available host computer for the phone call so that the remote client and available host computer can communicate directly without sending data through the server so that the phone call proceeds through the local phone service of the available host computer that is in the local area via the local phone line of the available host computer that is in the local area via data exchange between the available host computer and the client without sending data through the server.

15. The system of claim 14, wherein said local phone lines of said plurality of hosts comprises home and/or office telephone connections.

16. A business method, the method comprising charging clients for access through a computer server to a system comprising: a plurality of host computers and enabling client computers to access via the Internet the system comprising a plurality of host computers through the computer server, said plurality of host computers comprising personal computers, each of the plurality of host computers having access to a local phone service through a local phone line; the computer server controlling client computer access to the plurality of local phone services through the local phone lines; and permitting the access by a client computer upon verification of access rights of the client computer and by searching a directory of available host computers and providing the remote client an available host computer for an Internet user phone call so that the remote client and available host computer can communicate directly without sending data through the server, wherein the server routes the Internet user phone call through the Internet to a host computer that is in the local area of the destination of the phone call so that the phone call proceeds through the local phone service of the host computer that is in the local area via the local phone line of the host computer that is in the local area via data exchange between the available host computer and the client without sending data through the server.

17. The method of claim 16, wherein said local phone lines of said plurality of hosts comprises home and/or office telephone connections.

18. A business method, the method comprising providing virtual local phone service for a fee by providing a simulation of local phone service and voice communications to remote client devices that access a computer server through the Internet, the computer server providing the simulation of local phone service by controlling access to a plurality of host computers by maintaining a directory of available host computers and responding to client device requests by identifying an available host computer in a local area, said plurality of host computers comprising personal computers connected to local phone services by a plurality of local phone lines such that a client call from a remote client device is routed through the Internet and an available host computer to a destination served by a local phone service of the available host computer via the host computer's local phone line via data exchange between the available host computer and the client device without sending data through the server.

19. The method of claim 18, wherein said plurality of local phone lines comprise home and/or office telephone connections.

* * * * *